United States Patent [19]

Marier

[11] Patent Number: 4,593,921
[45] Date of Patent: Jun. 10, 1986

[54] STABILIZER SYSTEM FOR A SNOWMOBILE

[75] Inventor: Gregory J. Marier, Brooklyn Park, Minn.

[73] Assignee: Yamaha Hatsudoki Kabushiki Kaisha, Iwata, Japan

[21] Appl. No.: 722,949

[22] Filed: Apr. 15, 1985

[51] Int. Cl.⁴ ............................................. B62B 17/04
[52] U.S. Cl. .................................. 280/21 R; 280/25; 280/689; 280/708
[58] Field of Search ...................... 280/21 R, 21 A, 25, 280/22, 16, 689, 755, 707, 714, 708; 180/190, 191, 192, 193

[56] References Cited

U.S. PATENT DOCUMENTS 4,143,729  3/1979  West et al. ............................ 280/25
4,372,567  2/1983  Yasui et al. .......................... 280/21 R Primary Examiner—David M. Mitchell
Assistant Examiner—Eric Culbreth
Attorney, Agent, or Firm—Orrin M. Haugen; Thomas J. Nickolai

[57] ABSTRACT

Herein disclosed is a snowmobile stabilizer system which is constructed such that independent suspension systems attached to the right and left of a front portion of a snowmobile body for supporting steering skis, respectively, are equipped with air cushions, respectively, which have their air chambers communicating with an air reservoir through normally open adjusting valves. These normally open adjusting valves are controlled to associate with the steering operation of a steering handle such that the adjusting valve positioned at the side opposite to the steering direction is throttled.

16 Claims, 9 Drawing Figures

STABILIZER SYSTEM FOR A SNOWMOBILE

BACKGROUND OF THE INVENTION

I. Field of the Invention

This invention relates generally to a stabilizer system, and more specifically to a stabilizer system associated with the steering skis of a snowmobile for smoothing out the ride when the snowmobile vehicle is traversing irregular terrain.

II.

Discussion of the Prior Art

A suspension system for a snowmobile body typically comprises a pair of shock absorbing struts, which are independently coupled between the body/frame of the snowmobile and its pair of left and right steering skis. For example, the West et al U.S. Pat. No. 4,143,729, assigned to Monroe Auto Equipment Company, describes a snowmobile suspension system where each of the steering skis has a strut including a tubular housing attached to the bottom portion of the snowmobile body, and a second tubular housing is telescopingly disposed within the first tubular housing and is connected at its lower end to the ski. A reciprocable piston rod is attached to a portion of the vehicle, and there is a coil spring surrounding the rod and acting between the vehicle body and the portion of the strut coupled to the skis. While such a suspension helps to eliminate the jarring type of shocks occasioned by traversing various obstacles and uneven ground, the vehicle body is subject to sway during a turning maneuver because of the centrifugal force and the rather large strokes permitted by such prior art suspension system.

A partial solution to the roll or sway problem has been the use of a torsion bar. As is set out in the Yasui et al U.S. Pat. No. 4,372,567, which is assigned to the assignee of the instant application, a torsion bar is carried by the snowmobile and it is operatively connected to the suspension struts so that it becomes loaded upon movement of the respective suspension elements during vertical suspension movement of the skis, but without causing loading of the torsion bar upon rotation of the skis as during steering. A problem still remains with torsion bar suspension systems if only one of the skis encounters a bump. Hitting a bump tends to amplify the upward pitch of the snowmobile on the vehicle's side whose ski encounters the bump. This is due to the extra spring force added because of the presence of the torsion bar. The torsion bar also causes the spring and shock of the ski, i.e., the one that did not encounter the bump, to compress, and this effect tends to compound the pitching tendency. The torsion bar does prevent excessive body roll due to the stressing of the bar during a turn. However, if it should happen that during a turn the inside ski hits a bump, the torsion bar can become quickly "unwound", causing a sudden loss of the stabilizing effect. This, of course, can result in unexpected handling changes.

Because of the above-mentioned problems, a snowmobile should not be designed to have a torsion bar exhibiting strong spring properties.

SUMMARY OF THE INVENTION

The foregoing drawbacks to the prior art snowmobile suspension systems are overcome by providing a stabilizer system which permits the individual shock-mounted struts to exhibit their intrinsic soft shock absorbing effects, even when only one of the steering skis should encounter a bump. Furthermore, the stabilizer in accordance with the present invention prevents the snowmobile body from rolling to an excessive extent when one of the two steering skis encounters a bump during a turn. Specifically, the stabilizer system in accordance with the present invention incorporates pneumatic shock absorbing means disposed between each ski and the vehicle body, with the pneumatic chambers of each being joined to a gas reservoir through valving means that allows control of the spring rate of each ski independent of the other, but dependent upon the steering condition. When maintaining a straight-ahead condition, the skis act independnetly to bumps which may be encountered. This gives a smooth and comfortable ride. However, when the steering is directed off of center to the right or left, a valve system is operated, thereby allowing a stiff ski suspension on the outside of the curve which counteracts the centrifugal force and prevents excessive body roll. If the inside ski contacts an individual bump, the stabilizer effect remains constant.

OBJECTS

It is accordingly a principal object of the present invention to provide a new and improved suspension system for a snowmobile-type vehicle.

Another object of the invention is to provide a snowmobile suspension system affording a smoother ride while supressing the tendencies toward excessive roll, even when one of the two steering skis encounters a bump during a turning maneuver.

Yet another object of the invention is to provide a snowmobile suspension system in which the stiffness of the suspension system is controlled as a function of steering maneuvers.

These and other objects and advantages of the invention will become apparent to those skilled in the art from the following detailed description of a preferred embodiment, especially when considered in conjunction with the accompanying drawings in which like numerals in the several views refer to corresponding parts.

DESCRIPTION OF THE PREFERRED EMBODIMENT

Figure 1:
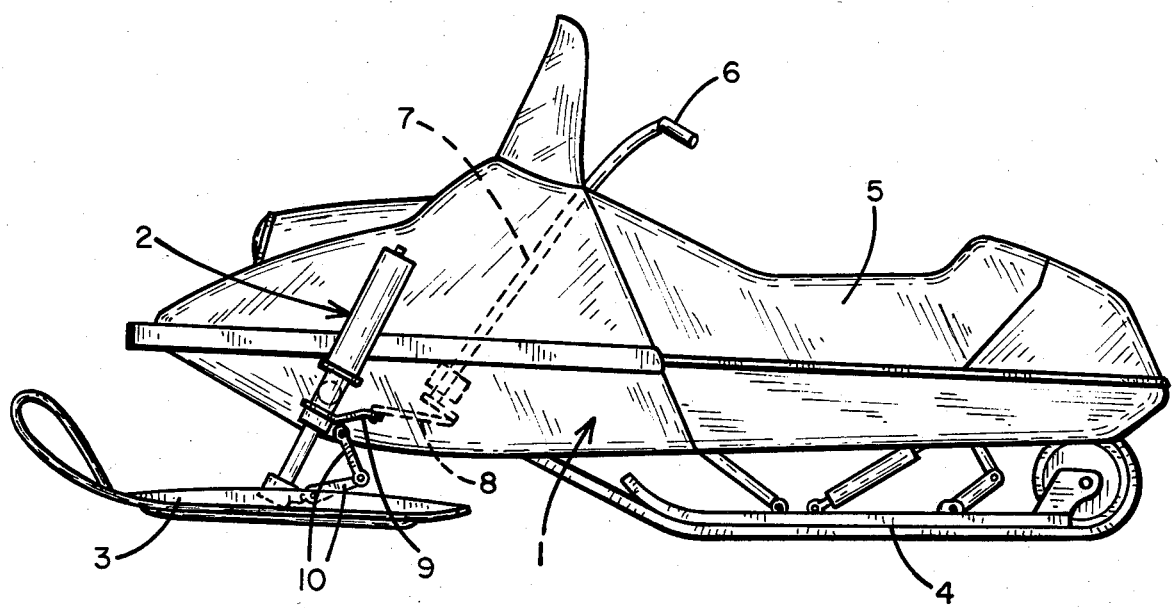
FIG. 1 is a side elevation showing a snowmobile incorporating the stabilizer system of the present invention.
Figure 2:
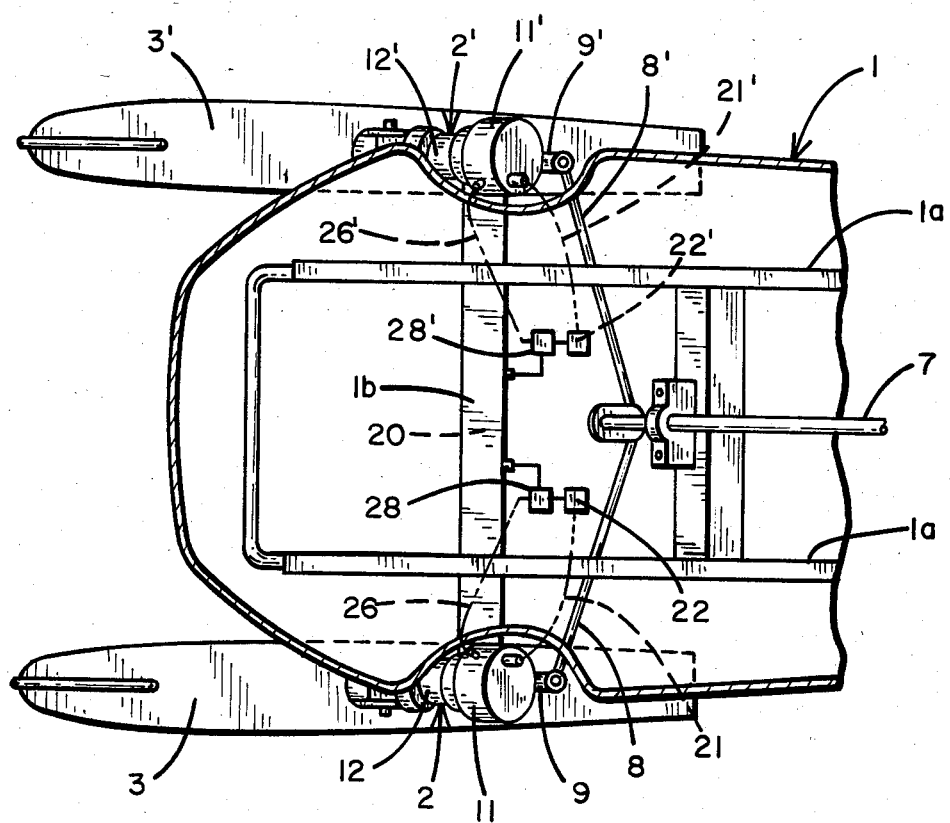
FIG. 2 is a top plan view showing the lower half of the front portion of the snowmobile of FIG. 1.

With reference to FIGS. 1 and 2, there is a shown a snowmobile, indicated generally by numeral 1, incorporating a pair of steering skis 3 and 3' which are, respectively, attached to the left and right sides of the front portion of the snowmobile 1 through independent suspension devices 2 and 2'. The body of the snowmobile 1 is equipped with a driving track 4 at its rear portion, and it includes a seat 5 upon which the operator rides, and a steering handle 6 is appropriately positioned to allow the operator to steer the skis 3–3'.

Figure 3:
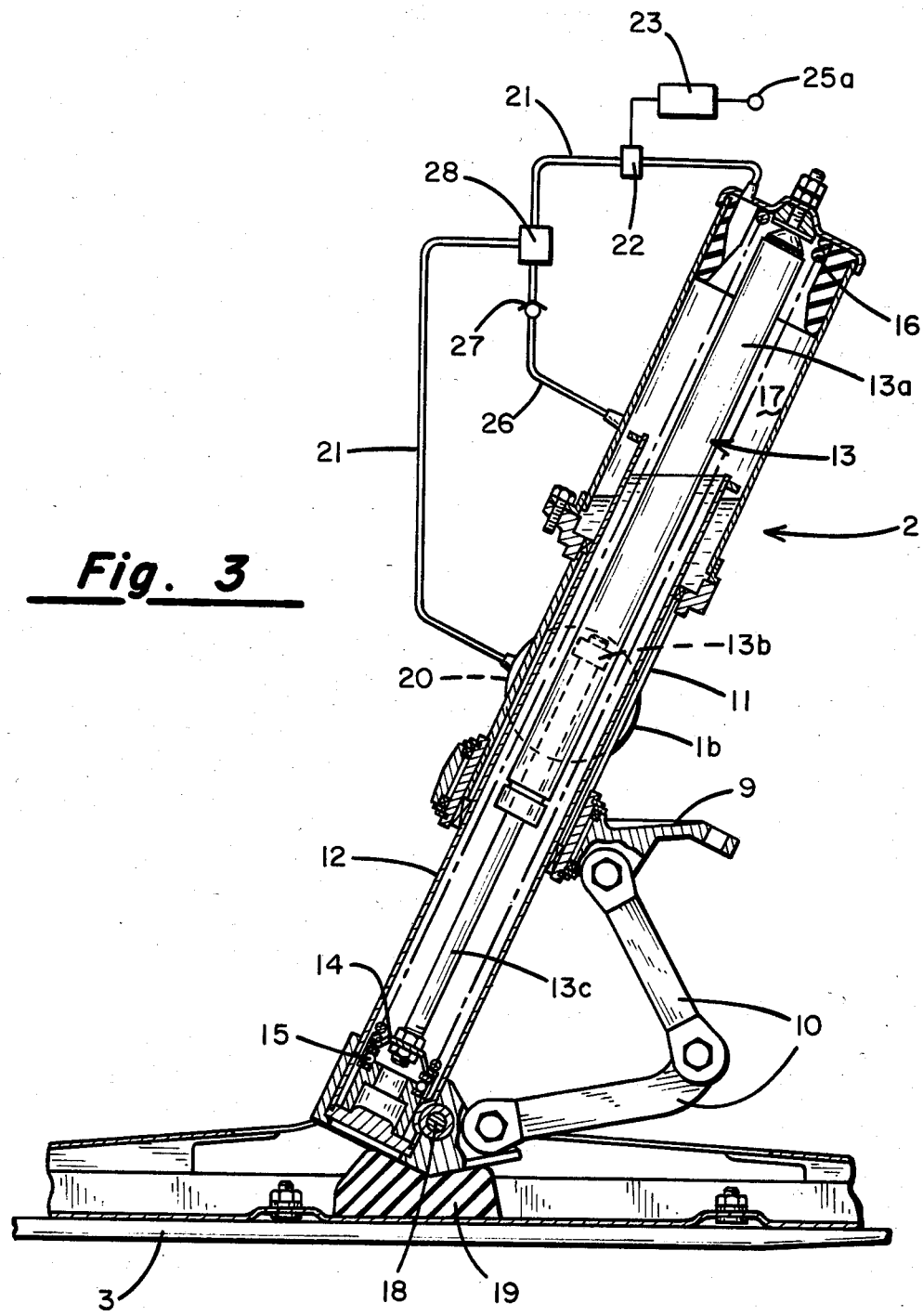
FIG. 3 is a cross-sectional view of a ski suspension strut in accordance with the present invention.

More specifically, the handlebar 6 is affixed to the upper end of a steering column 7, which is disposed along the central longitudinal axis of the vehicle, and the lower end of the steering column is operatively coupled through tie-rods 8 and 8' to the steering arms 9 and 9' of the independent suspension devices 2 and 2'. As can best be seen in FIG. 1, the steering arms 9 and 9' are also connected to the steering skis 3 and 3' through the articulated links as at 10. As a result, when the handlebar is turned to the right or left, the steering skis 3 and 3' are also turned to the right or left through the steering column 7, the tie-rods 8 and 8', the steering arms 9 and 9' and the articulated links 10 on either side of the vehicle. The suspension devices 2 and 2' are disposed on opposite sides of the snowmobile vehicle 1 near the front portion of the body. More specifically, there is identified by numeral 1(a) a portion of the frame upon which the body 1 is secured. A reinforcing tube 1(b) extends transversely to the frame members 1(a) and the two are bolted, welded or otherwise attached to one another. As can be seen in the top view of FIG. 2, the reinforcing tube 1(b) extends outward of the longitudinal frame elements 1(a), and attached at opposed ends thereof are the independent suspension systems 2 and 2'. With reference to FIGS. 2 and 3, each of the independent suspension systems 2 and 2' includes an outer sleeve 11 into which a cylindrical strut 12 telescopingly fits for reciprocating and rotational motion therein. It is the outer sleeve 11 which is affixed to the ends of the reinforcing tube 1(b).

Considering only the left ski and suspension device, coaxially disposed within the outer sleeve 11 and the tubular strut 12 is a shock absorber member 13, which is of somewhat conventional design in that it includes an oil filled cylinder 13(a) in which a piston 13(b) attached to the end of a piston rod 13(c) can move up and down under shock loads. Concentrically disposed within the sleeve 11 and the strut 12 is a coil spring 16. The shock absorber 13 has its upper end attached to a cap on the upper end of the outer sleeve 11, and the lower end of the piston rod 13(c) has a retainer 14 bolted thereon, the retainer being supported on the bottom face of the strut 12 by way of thrust bearing 15. The aforementioned coil spring 16 extends between the retainer plate 14 and the cap member on the upper end of the outer sleeve 11. Using this construction, the strut 12 is capable of rotating within the sleeve 11 and is axially movable up and down within the sleeve 11, with the shock absorber 13 and the coil spring 16 operatively disposed therein for appropriately shock mounting and suspending the body relative to the front steerable ski 3. The independent suspension device 2' is identical to the above-described arrangement.

With continued reference to FIG. 3, it can be seen that the cylindrical strut 12 is filled with a suitable hydraulic fluid, such as oil, to a level such that a predetermined air space 17 exists within the outer sleeve 11 above the level of the oil. As will be further explained, this air chamber functions as an air cushion. By controlling the level of the oil within the chamber, the 'resiliency' of the air cushion can be controlled.

The steering ski 3 is attached to the lower end of the strut 12 by means of a hinge pin 18. Located on the upper surface of the steering ski 3 is a rubber member 19, which is positioned to abut the lower end face of the strut 12 so as to preclude the steering ski 3 from fluttering, i.e., pitching in the longitudinal direction.

Because the steering arm is rotatably supported around the lower end portion of the outer sleeve 11 and because of the manner in which the linkages 10 couple the steering arm 9 to the ski 3, the steering arm 9 can be turned to the right or left in response to the steering operation of the handlebar 6. In that the linkages 10 ae articulated, the strut 12 is capable of moving up and down within the outer sleeve 11, but restrained by the action of the shock absorber 13 and the suspension spring 16.

Figure 4:
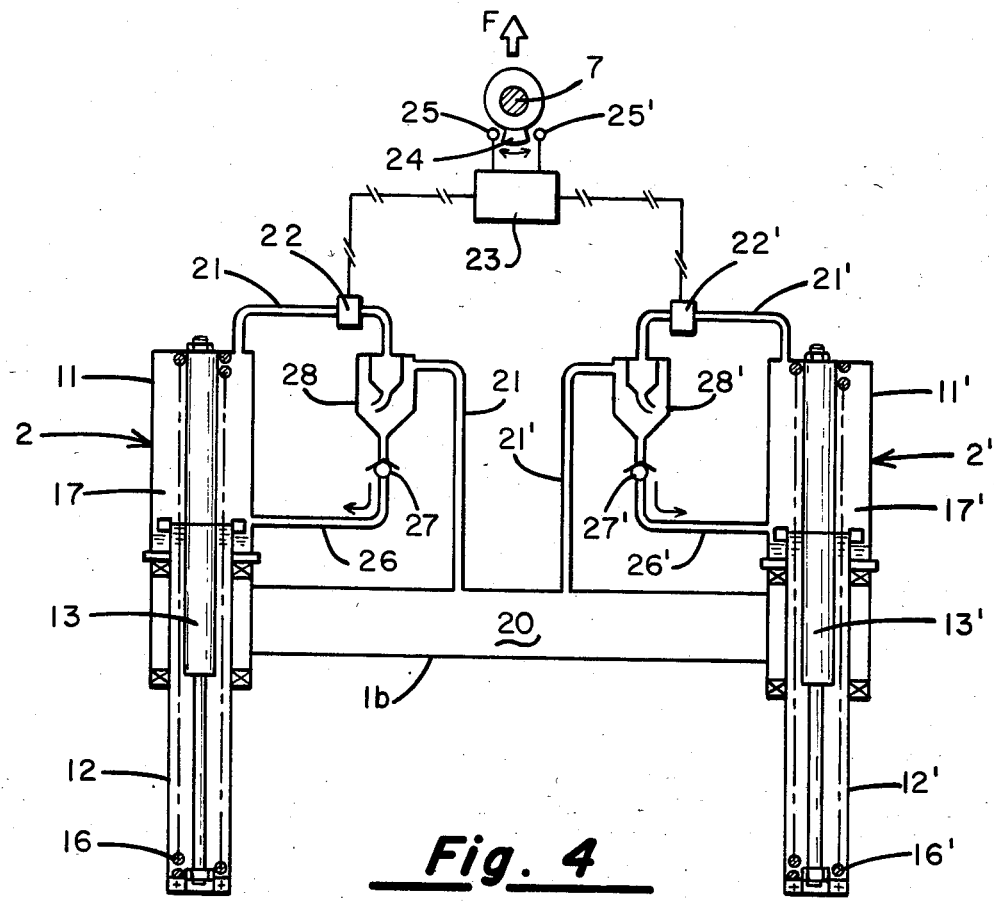
FIG. 4 is a schematic hydraulic diagram depicting the stabilizer system of the present invention.

The independent suspension systems 2 and 2' and their mode of attachment to a snowmobile vehicle frame and steering ski thus far described are fairly conventional. Reference will now be made to FIG. 4 to help explain the improvement comprising the present invention. As can be seen in FIG. 4, the air chambers 17 and 17' of each device 2 and 2' are in fluid communication with an air reservoir 20 of a substantial capacity by way of tubular conduits 21 and 21'. The reservoir is actually embodied in the tubular reinforcing pipe 1(b). It is to be understood, however, that a separate reservoir, which is independent from the reinforcing pipe 1(a), can be used instead. It is also possible that separate air chambers be provided to act as reservoirs for the left and right chambers 17 and 17'. Interposed in the lines 21 extending between the fluid chambers 17 and 17' and the reservoir 20 are separate solenoid valves 22 and 22', which are normally in an open or fluid-passing disposition. Also included in the fluid flow path between the respective air chambers 17 and 17' and the larger reservoir 20 are oil separators 28 and 28'. These oil separators are provided to extract any oil which may be entrained in the air existing in the air cushion chambers 17 and 17'. That is to say, the air, having flowed from one of the chambers (say chamber 17) into the oil separator 28, has its oil content separated from the air, with the oil content being returned once more to the chamber 17 via the return conduit 26 while the air, now freed of its oil, passes to the reservoir 20. Check valves, as at 27 and 27', preclude backflow of air and/or oil from the chamber 17 to the oil separator 28 via the return conduit 26.

As has already been mentioned, the left and right solenoid valves 22 and 22' are normally in an open, fluid-passing state when the steering skis and handlebar are positioned for straight-ahead movement. The solenoid valves are arranged to be controlled by electrical signals from a control unit 23 having spaced-apart sensors 25 and 25' for detecting the orientation of the steering column 7. More specifically, and as is shown in the schematic diagram of FIG. 4, a cam member 24 is suitably secured to the steering column 7 so that it will rotate (as indicated by the small arrows) when the handlebar is turned clockwise or counterclockwise. Thus, when the handlebar 6 is turned to the right with respect to a forward-running direction, the cam 24 is brought into contact with the leftmost sensor 25, causing the control unit 23 to produce a signal for actuating the solenoid valve 22 associated with the air chamber 17 of the left suspension member 2. When the handlebar 6 is turned to the left with respect to the forward direction F of the vehicle, cam 24 will be brought into abutment with the sensor 25', causing control unit 23 to produce an electrical signal for actuating the solenoid valve 22' associated with the independent suspension member on the right side of the vehicle.

When either valve 22 or 22' is closed, under influence of the signals produced by the sensor mechanism 23, the air in the respective air chamber 17 or 17' will be blocked from flowing out to the reservoir 20, and this has the effect of increasing the spring constant or "stiffness" of the air cushion formed in the affected air chamber 17 or 17'. As a result, the snowmobile body is prevented from leaning to the outside during turning or cornering so that the vehicle can maintain a stable disposition.

When running straight-ahead, however, both the left and right solenoid valves 22 and 22' are kept in their open positions so that the spring constant of the air cushion within the chambers 17 and 17' is not increased. Thus, even if one or the other of the two steering skis hits a bump, the corresponding independent suspension device 2 or 2' can still exhibit its full intrinsic soft shock absorbing effect. The strut 12 associated with the side of the ski hitting the bump will contract into its associated outer sleeve 11, but the independent suspension system at the side of the vehicle not encountering the bump will not responsively contract as it would if a torsion bar were employed. Thus, the vehicle will not tend to lean in a transverse direction.

Even during a turn, the right and left independent suspension systems 2 and 2' do not interact with one another, but instead remain independent. This, of course, is different from the action achieved when a torsion bar-type stabilizer system is employed. Thus, each of the independent systems 2 or 2' can exhibit its own intrinsic soft shock absorbing property when only one of the two steering skis 3 or 3' traverses a bump.

The aforementioned sensors 25 and 25' may employ either electronic elements which make use of pressure sensitive or photo sensitive means. Alternatively, mechanically operable Microswitches can effectively be utilized. Furthermore, the mounting positions of the sensors 25 and 25' need not necessarily be disposed in locations where they are driven by a cam on the steering column 7 as in the above-described embodiment, but, alternatively, may be located so as to be engaged by other members which move during a turning operation, e.g., the steering arms 9.

It is also contemplated that, instead of using solenoid valves 22 and 22', a rotary valve 22(a) (FIG. 5) can be used, which is made to rotate along with the steering column 7. As can be seen in that figure, the rotary valve 22(a) is mechanically driven by the steering column 7, thus obviating the need for electrical sensors as at 25 and 25' in FIG. 4.

The rotary valve 22(a) moves to an air occluding position relative to valve port 21(a) when the handlebar is turned to the right, and the member 22(a) blocks the port 21(b) when the handlebar is turned so as to make a left turn. The net result is substantially the same as far as vehicle performance is concerned as when one or the other of the solenoid valves 22 or 22' in FIG. 4 is operated.

Figure 5:
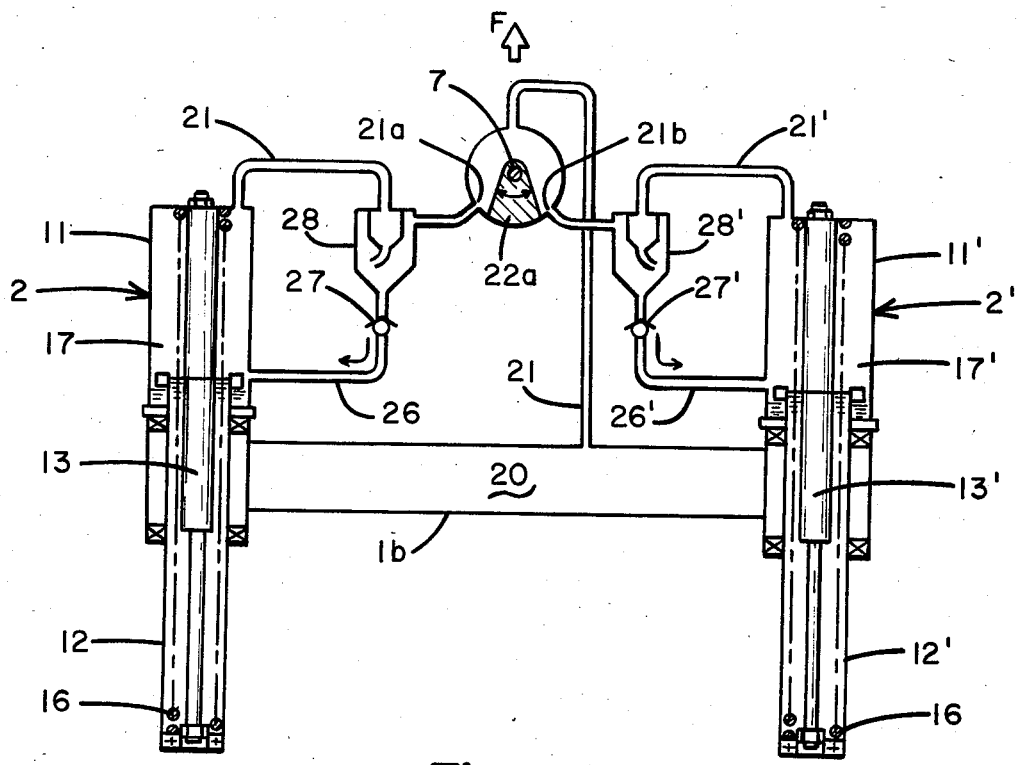
FIG. 5 is a further schematic hydraulic diagram showing the stablizer system according to an alternative embodiment of the present invention.

While solenoid valves, as in FIG. 4, operate in either a fully open or fully closed manner, the rotary valve, as in FIG. 5, functions to throttle the valves over a continuous range between their fully open and fully closed positions, all in accordance with the extent to which the handlebar is turned.

Figure 6:
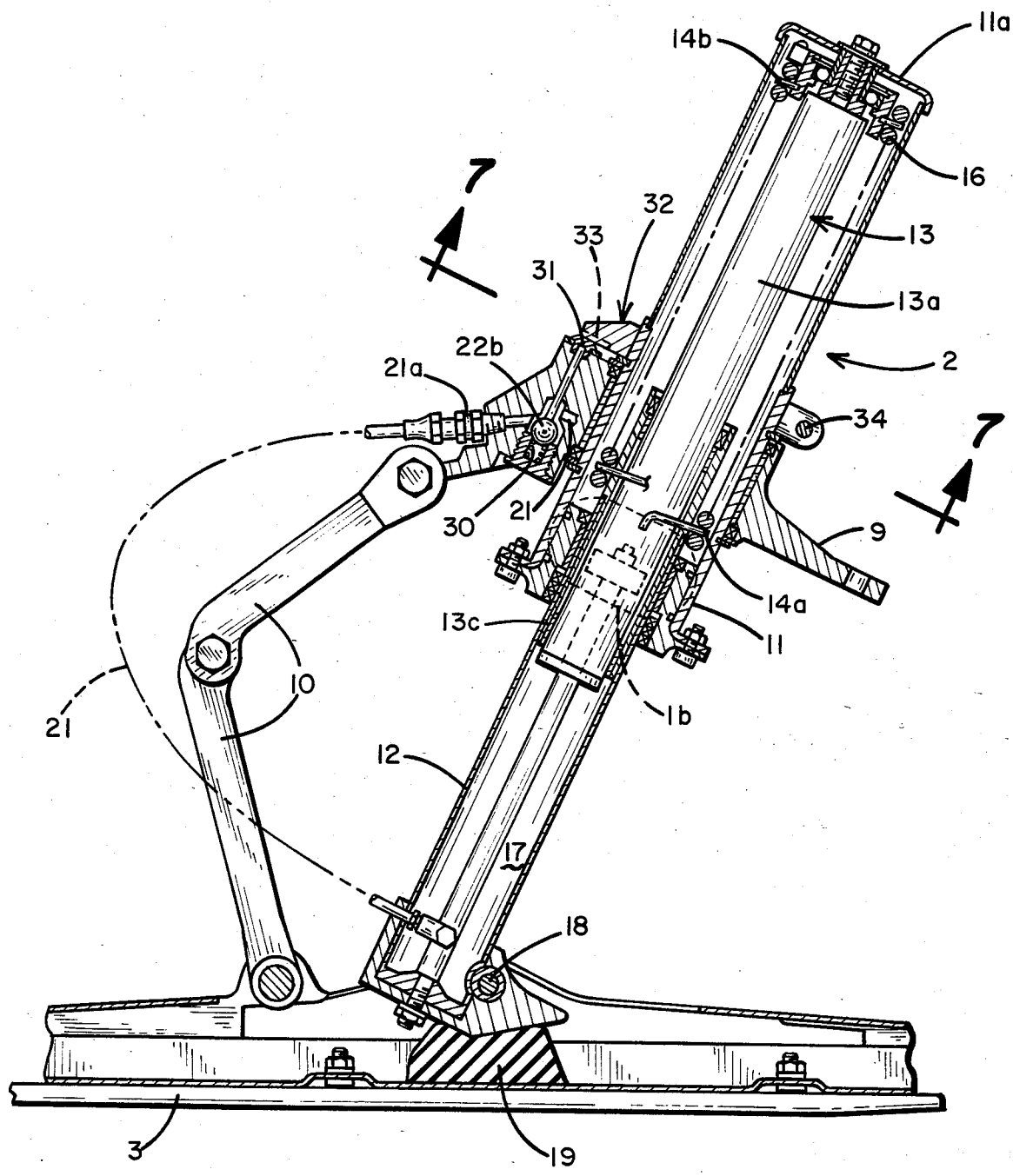
FIG. 6 is a cross-sectional view showing a portion of the suspension strut of a further alternative embodiment.
Figure 7:
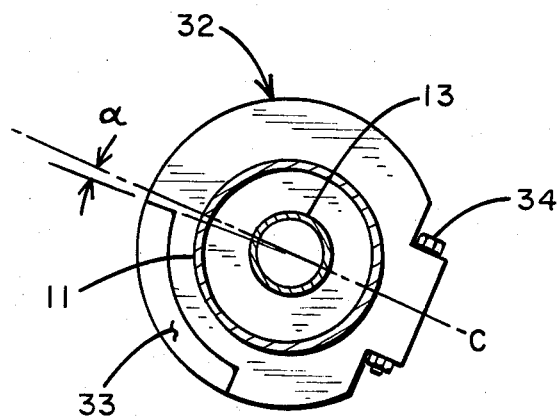
FIG. 7 is a cross-sectional view taken along the line 7—7 in FIG. 6.
Figure 8:
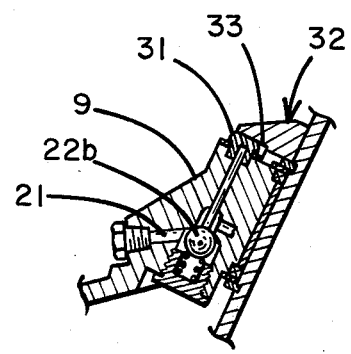
FIG. 8 is a partial view of FIG. 6 in which the adjusting valve is fully closed.

A further alternative embodiment in accordance with the present invention is illustrated in FIGS. 6–8 of the drawings. As can be seen in these drawings, the independent suspension systems 2-2' are identically constructed and considering only the leftmost side, the cylindrical strut 12 is telescopingly received and reciprocally movable with the outer sleeve 11, which outer sleeve is attached to the frame of the snowmobile. Furthermore, the strut 12 is capable of rotational movement within the sleeve 11, allowing the skis 3 to be steered. A suitable seal 13(c) is inserted between the outside diameter of the shock absorber's cylinder 13(a) and the inside diameter of the strut 12, which prevents the escape of gas (air) while permitting rotational and vertical movement between these two assemblies. Because of the gas-tight seal between the strut 12 and the shock absorber 13, the air chamber 17 constitutes an air cushion within the confines of the tubular strut 12. Using this modification, the need for oil to adjust the capacity of the air chamber as in FIG. 3 is obviated.

Another difference between the embodiments of FIGS. 3 and 6 is that in the embodiment of FIG. 6, the coil spring 16 is secured at its lower end by a retainer 14(a), which is fixed in the upper portion of the strut 12 rather than at the base of the strut 12 as in FIG. 3. The upper end of the spring 16 in FIG. 6 is held by a retainer 14(b), which is rotatably supported at the center of the cap 11(a). As a result, the spring 16 exerts its force on the strut, both when it is moving upward or downward within the sleeve 11.

The air chamber 17 in the embodiment of FIG. 6 is in fluid communication with the air reservoir 20 in the reinforcing pipe 1(b) by means of the air conduit 21 which has a first fitting 21(a) screwed into a threaded orifice in the steering arm 9. This orifice, in turn, communicates with a chamber in which a ball valve assembly 30 is also fitted. The ball member 22(b) is urged upward by the action of the spring 30, and a follower 31 is made to abut of the ball member 22(b) with its upper end cooperating with a cam member 32, which is affixed to and rotates with the sleeve 11. The cam 32 has its lower face configured to cooperate with the follower member 31. More specifically, the follower 31 is adapted to ride in an arcuate recess 33, which extends in the circumferential direction over a predetermined arc. The follower 31 and the cam 32 function together as a sensor for detecting the steering operation of the handlebar 6.

As is shown in FIG. 7, the cam 32 is affixed to the outer sleeve 11 by being clamped to place by a bolt 34, and the arcuate recess 33 formed in the lower face of the half of the cam 32 which is at the right side of the longitudinal centerline C and extends over a length corresponding to the entire rotational travel of the right turn steering angle.

The independent suspension device 2' associated with the other ski has a similar cam 32 fixed to its outer sleeve 11' but that cam has its arcuate recess 33' formed in the lower face of the cam but along the half thereof which is on the left side with respect to the longitudinal centerline C and which extends in an arcuate direction over the entire region of a leftward steering angle. A small angle, α, is provided in which the arcuate recesses 33 and 33' do not overlap. This angle, α, can be adjusted by loosening the bolt 34 to rotate the cam 32 to insure that the arcuate resesses associated with the cams 32 and 32' on the left and right skis, respectively, do not effectively overlap.

With a snowmobile incorporating the independent suspension systems shown in FIGS. 6 and 7 of the drawings, if it is assumed that the handlebar is turned so as to steer the skis to the right, the right and left steering arms 9 and 9' are simultaneously turned to the right. The follower 31 of the ball valve 30, which is mounted in the left steering arm 9, rises into the arcuate recess 33 formed in the lower face of the right half of the cam 32 so that the ball valve 22(b) is shifted from its open state, as shown in FIG. 7, to close the air conduit 21 (FIG. 8). At this time, however, the follower 31' of the ball valve 30' mounted in the right steering arm 9' does not face the arcuate recess 33' of the cam 32' so that the ball valve 30' allows the air to pass through the branch 21 leading to the reservoir in the tube 1b.

When the steering handle 6 is steered to make a left turn, the actions are just the reverse of the above. That is, ball valve 30' of the right steering arm 9' is closed whereas the ball valve 30 of the left steering arm 9 is left in its open state. Hence, fluid (air) can pass through the valve 30 to the reservoir in the pipe 1b.

As was the case of the embodiment of FIG. 3, the spring constant of the air cushion contained within the air chamber 17 in FIG. 6 associated with the side of the vehicle that is closed during a turn is increased, thus preventing the snowmobile's body from leaning to the outside during the cornering maneuver. During a straight-on run, however, both ball valves 30 and 30' are open so that the air within the chamber 17 of the strut 12 may pass to the reservoir in the pipe 1(b) and spring constant of the air cushion is at a low level. Thus, even if only one of the steering skis, e.g., ski 3, hits a bump, the corresponding independent suspension system 2 can exhibit its intrinsic soft shock absorbing property while the independent suspension 2' on the other side does not responsively contract which would allow the snowmobile body to lean excessively.

In the embodiment of FIGS. 6-8, the operation of the steering bar 6 is not sensed at the steering column 7 as in the embodiment of FIG. 3, but instead from the steering arms 9 and 9'. Because of this, any play which may exist in the steering column does not delay the operation of the valve members 30 and 30(b), and the responsiveness of the system is thereby improved.

Figure 9:
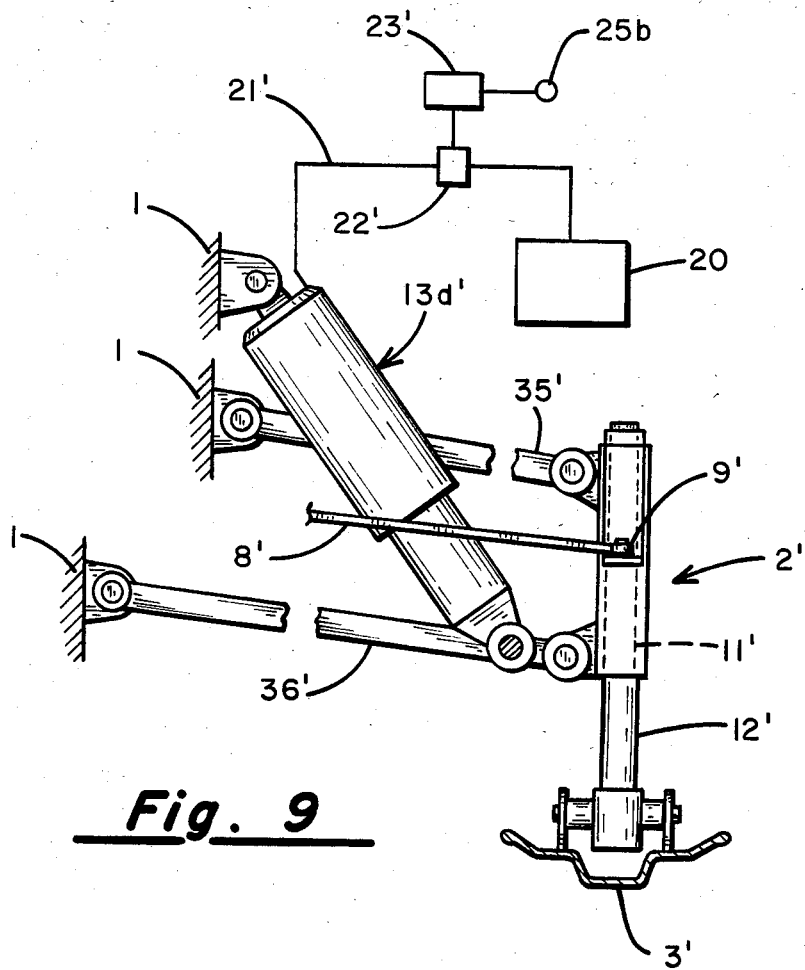
FIG. 9 is a mechanical schematic diagram of a still further construction in accordance with the present invention.

Referring next to FIG. 9, a still further embodiment of the present invention is illustrated. Here, the independent suspension systems are applied to the so-called "double wishbone" type of snowmobile suspension. For purposes of illustration, FIG. 9 only shows the assembly associated with the rightmost ski. Again, the strut 12' whose lower end is secured to the ski 3' is free to rotate within the sleeve 11'. The strut 12' may be rotated within the sleeve 11' by means of the tie-rod 8' which is joined to the steering arm 9'.

The outer sleeve 11' supporting the strut 12' is pivotally linked to the frame 1 by two wishbone-type arms 35' and 36', which are arranged vertically in a parallel relationship, and a shock absorber 13(d)' extends between the frame 1 and the outer end of the arm 36'. Contained within the shock absorber 13(d) is an air chamber (not shown).

Because of the supporting structure afforded by the parallel arms 35' and 36', the outer sleeve 11' and the strut 12' are able to move vertically such that the ground-contacting faces of the steering skis 3 and 3' remain generally parallel to the ground.

The air chamber contained within the shock absorber 13(d) is coupled via an air passage or conduit 21' to the reservoir 20 as in the previously described embodiments. This air conduit includes a valve 22' which may be an electrically operated solenoid valve which, again, may be closed through the application of a suitable electrical signal from the control unit 23' in response to a detected signal coming from the sensor 25(b).

The stabilizer system embodied in the arrangement of FIG. 9 is constructed such that the independent suspension system 2' attached to the right and left front portions of the snowmobile frame are equipped with air cushions whose air chambers communicate with a large volume reservoir through the normally open valves 22 and 22', and the normally open valves are designed to be responsive to changes in the steering operation of the vehicle to throttle the valve passage located at the side of the vehicle which is opposite to the direction in which it is being steered. As a result, during a cornering manuever, the independent suspension system 2 or 2', which is at the side opposite to the direction in which the vehicle is being steered, has the spring constant of its air cushion increased to stabilize the position of the vehicle body during that maneuver.

On straight-ahead runs, however, because both the right and left adjusting valves 22 and 22' are both in their open condition, the spring constant of the air cushions associated with the chambers within the shock absorbers 13(d) and 13(d)' is maintained at a low value, allowing each of the independent suspension systems to exhibit its intrinsic soft shock absorbing property even when only one of the two skis should encounter a bump. Then, too, when one of the two skis encounters a bump, it does not adversely impact the operation of the suspension device on the other side of the body, which otherwise might cause the snowmobile vehicle to lean in a transverse direction.

The invention has been described herein in considerable detail in order to comply with the Patent Statutes and to provide those skilled in the art with the information needed to apply the novel principles, and to construct and use such specialized components as are required. Hence, it is to be understood that the invention can be carried out by specifically different equipment and devices, e.g., recreational vehicles other than snowmobiles, and that various modifications, both as to equipment details and operating procedures, can be accomplished without departing from the scope of the invention itself.

What is claimed is:

1. A stabilizer system for a snowmobile vehicle, comprising:
   a pair of right and left steering skis;
   independent suspension means attached to the right and left of a front portion of a snowmobile frame and including shock absorbing means, said pair of steering skis being adapted to be steered to the right and left by a steering handle;
   air cushion means contained in said independent suspension means, said air cushion means having expandable and contractible air chambers;

an enclosed air reservoir mounted in said snowmobile body for containing air;

air conduits for providing communications between said air chambers of said independent suspension means and said air reservoir;

normally open adjusting valves mounted in said air conduits for controlling air flow through said conduits; and said adjusting valves being operatively coupled with the steering operation of said steering handle for throttling the air flow through the one of said adjusting valves associated with the air chamber of the independent suspension means positioned at the side of the snowmobile which is opposite to the direction in which the vehicle is being steered away from a straight-ahead direction.

2. A snowmobile stablizer system as set forth in claim 1 wherein each of said independent suspension means comprises:

an outer sleeve fixed to said snowmobile frame;

a steering arm rotatably mounted on said outer sleeve;

a tubular strut held coaxially rotatable and axially movable in said outer sleeve; and said shock absorbing means and said air cushion means being disposed between said strut and said outer sleeve, said strut having one of said steering skis attached to its lower end and connected through a linkage means to said steering arm for transmitting the turning movement of said steering arm following the steering operation of said steering handle to said steering ski.

3. A snowmobile stabilizer system as set forth in claim 1 wherein said independent suspension means are of the double wishbone type.

4. A snowmobile stabilizer system as set forth in claim 1 wherein said air reservoir is formed in the space in a tubular reinforcing member comprising a portion of said frame.

5. A snowmobile stabilizer means as set forth in claim 2 wherein said air cushion means includes an air chamber formed by a space in said tubular strut.

6. A snowmobile stabilizer system as set forth in claim 2 wherein said outer sleeve has its inside charged with oil to provide a space thereabove as an air chamber portion of said air cushion means.

7. A snowmobile stabilizer system as set forth in claim 6 wherein the air conduit for providing the communication between said air chamber and said air reservoir includes oil separator means having a separated oil outlet communicating with said air chamber via a return pipe and a check valve disposed in said return pipe.

8. A snowmobile stabilizer system as set forth in claim 1 wherein said one of said adjusting valves is moved between its fully open and fully closed positions upon turning of said steering handle.

9. A snowmobile stabilizer system as set forth in claim 1 wherein said adjusting valve is throttled continuously between its fully open and fully closed positions in accordance with the steered extent of said steering handle.

10. A snowmobile stabilizer system as set forth in claim 2 wherein said adjusting valve is a solenoid valve and wherein sensor means are associated with said steering handle for developing a signal for operating said solenoid valve.

11. A snowmobile stabilizer system as set forth in claim 10 wherein said sensor means detects the turn of a steering column rotated by said steering handle.

12. A snowmobile stabilizer system as set forth in claim 10 wherein said sensor means senses the movement of said steering arm.

13. A snowmobile stabilizer system as set forth in claim 10 wherein said sensor means is a Microswitch.

14. A snowmobile stabilizer system as set forth in claim 2 wherein said adjusting valve is a rotary valve coupled to the steering column of said steering handle.

15. A snowmobile stabilizer system as set forth in claim 2 wherein said adjusting valve is mounted in said steering arm and is adapted to be driven by a cam attached to said outer sleeve.

16. A snowmobile stabilizer system as set forth in claim 15 wherein the position of said cam on said outer sleeve can be adjusted.

* * * * *